July 9, 1957    J. ALLAN ET AL    2,798,258
PROCESS OF EXTRUDING SHEETS
Filed March 12, 1954

INVENTORS
JOHN ALLAN
DENIS W. BROWNE
HENRY SAMUEL
BY
Felix Klass & Abner Sheffer
ATTORNEYS United States Patent Office 2,798,258
Patented July 9, 1957

2,798,258

PROCESS OF EXTRUDING SHEETS

John Allan, Denis Wheeler Browne, and Henry Samuel, Wrexham, Wales, assignors to British Celanese Limited, a corporation of Great Britain Application March 12, 1954, Serial No. 415,946

Claims priority, application Great Britain March 18, 1953

4 Claims. (Cl. 18—55)

This invention relates to the manufacture of plastic products by extruding hot thermoplastic material in the absence of volatile liquids, and in particular to the manufacture of products showing colour or other effects.

We have found that by extruding in this way mixtures of two thermoplastic materials of different thermal properties (i. e. such that, at a given elevated temperature and under a given pressure, one flows at a greater rate than the other), products showing attractive effects can be obtained, especially if the two thermoplastic materials are differently coloured. Thus, for example, by selecting suitable colours for the two materials and extruding under conditions in which the one material becomes fluid and forms a matrix in which the other is distributed, pleasing variegated effects can be obtained.

According, therefore, to the process of the invention, two thermoplastic materials which have different heat-softening properties, and which are free from volatile liquids, are fed to a chamber through which they are forced under pressure, while being intermixed and heated to a temperature at which one of said materials is more plastic than the other, and from which the mixture is extruded in the form of a coherent product in which regions occupied by the one material are visually distinguishable from regions occupied by the other. Preferably the extrusion is effected by means of a screw extruder into the barrel of which the thermoplastic materials are fed.

The thermoplastic materials that are used in admixture must be compatible in the sense that they are capable under conditions of hot-extrusion of forming a coherent extruded body. The thermoplastic materials employed comprise thermoplastic linear high-polyemrs. The materials may or may not contain plasticizers for the polymers according to the nature of polymers and the conditions of extrusion. With many polymers a plasticizer is essential. With others improved effects can be obtained by incorporating plasticizers, although extrusion could be effected without. The compositions preferably contain colouring agents for one or more of the polymers. Other substances that contribute to the effects obtained, e. g. metallic powders may also be present. The thermoplastic materials may in addition contain substances adapted to stabilize the material against degradation and/or discolouration due, for example, to the effect of heat, or of exposure to oxidizing atmospheres or to light.

The flow properties of the thermoplastic material depend upon a number of factors of which the most important are the following: (1) the chemical nature of the groups composing the polymer chains; (2) the regularity of structure of said chains; (3) the size of any side-groups on the chains; (4) the average molecular weight of the polymer; (5) the nature of any plasticizer present; and (6) the amount of any plasticizer.

The presence in the polymer chains of groups leading to strong inter-chain forces, e. g. of dipole attraction or hydrogen bonding, is generally accompanied by high heat-softening temperatures and, in consequence, low or negligible flow rates except at relatively high temperatures. This tendency is shown, for example, in polymers containing recurring units such as —CH(CN).CH$_2$—
—C(CN)$_2$.CH$_2$—
$\geqslant$C(OH)
and —CO(NH)

Regularity of structure such that the polymer chains can approach one another closely and fit into a crystal lattice also tends in the same direction, as shown by polymers in which the chain is built up of a single unit without side chains, e. g. cellulose triacetate, 6.6-nylon and polyethylene terephthalate. Such polymers may be contrasted with polymers of less regular structure, e. g. polyvinyl chloride-acetate and the copolymers of vinyl chloride with vinylidene chloride, of vinyl chloride or vinylidene chloride with acrylonitrile and of acrylonitrile with methacrylonitrile; with mixed condensation polymers, e. g. condensation polymers of hexamethylene diamine with both adipic and sebacic acids; with secondary cellulose esters, e. g. acetone-soluble cellulose acetate; with cellulose esters containing the radicals of two different fatty acids, e. g. cellulose acetate-butyrate and cellulose acetate-propionate; and with partial ethers of cellulose, e. g. the ethyl celluloses of commerce. Large and relatively inactive side-groups in general lead to reduced heat-softening point, and in consequence give higher rates of flow at moderately elevated temperatures, as appears from comparison, for example, of a secondary cellulose acetate with a cellulose propionate or cellulose butyrate of the same degree of substitution. Large rigid side chains may, however, increase the rigidity of the molecular chains and so lead to reduced flow rate under given conditions, as for example in polystyrene. Increasing the average chain-length of the polymer results in an increase in inter-chain forces and in general a correspondingly lower flow rate.

Plasticization leads to increased flow rate under given conditions, and the effect is greater the higher the proportion of plasticizer. The nature of the plasticizer and its viscosity are both important factors. When the inter-chain forces in the polymer are relatively small and the polymer is not crystalline, as in polyvinyl chloride, there need be little chemical affinity between plasticizer and polymer, and the highest flow rates will generally be obtained when the thermoplastic material contains a high proportion of a long-chain plasticizer of low viscosity. When the polymer is crystalline or contains groups resulting in high inter-chain forces, some chemical affinity appears to be necessary between the plasticizer and polymer. Provided this affinity be sufficient the greater the chain length and the lower the viscosity of the plasticizer the higher is the flow rate under given conditions.

The general way in which various factors affect the rate of flow under given conditions has been outlined above. Naturally, the relative importance of the various factors varies from case to case so that it is not always possible to determine on theoretical grounds what effect a particular change in the nature of the thermoplastic material will have on its flow properties. It is a simple matter, however, to compare the flow properties of two thermoplastic materials at a particular temperature within the range suitable for extrusion, using an extrusion plastimeter.

The thermoplastic materials may with advantage be based on cellulose derivatives, especially cellulose esters of carboxylic acids which contain two to four carbon atoms in the molecule. A suitable difference in flow properties can be obtained by using two cellulose esters of the same carboxylic acid, of different degrees substitution. Thus, for example, the thermoplastic material of greater flow rate under the extrusion conditions may be a cellulose acetate of acetyl value (expressed as percentage of combined acetic acid) 51 to 54, and the material of lower flow rate may be based on cellulose acetate of substantially greater acetyl value, e. g. 56 to 62.5% and preferably 57 to 59%. The ester of the thermoplastic material of lower flow rate may with advantage be of higher average molecular weight, measured viscometrically, than that of the material of higher flow rate; for instance the ratio of the average molecular weights of the two esters may range from 2:1 to 5:1 or even higher, e. g. up to 10:1.

Both esters may be plasticized with the same plasticizer or mixture of plasticizers, the material of greater flow rate preferably containing the higher proportion of plasticizer. Thus, for instance, the material of higher flow rate may contain 20 to 60% of plasticizer against 10 to 30% in the material of lower flow rate, these percentages being based on the weight of cellulose ester. The plasticizers of the two materials need not be the same. It is of advantage, for instance, for the material of higher flow rate to be plasticized with a plasticizer or mixture of plasticizers of lower viscosity at the extrusion temperature than the plasticizer or mixture of plasticizers used in the material of lower flow rate. The plasticizer or mixture of plasticizers in the material of higher flow rate may have a greater affinity (as shown by lower solution temperature) and/or a higher compatibility, for the ester in that material than the plasticizer or mixture of plasticizers in the material of low flow rate has for either cellulose ester. Plasticizers of high affinity for, and high compatibility with, cellulose acetates of acetyl content from 51 to 54% include: dimethyl phthalate, triacetin, p-toluene sulphonamide, trichlorethyl phosphate, dibutyl tartrate and acetyl triethyl citrate. Plasticizers of lower affinity and compatibility include: diethyl phthalate and especially dibutyl phthalate and triphenyl phosphate. All these plasticizers have still lower affinity for cellulose acetates of higher acetyl value. Triphenyl phosphate, although of low compatibility with cellulose acetate in general, and in spite of being solid at ordinary temperatures, is useful in admixture with liquid plasticizers of higher affinity. Both thermoplastic materials may contain such a plasticizer, and the proportion of such plasticizer relative to more active plasticizer may be greater in the material of lower flow rate. Similarly the two thermoplastic materials can be based on other esters differing in degree of substitution. The esters may for example be cellulose propionates, cellulose butyrates, cellulose acetate-propionates or cellulose acetate-butyrates. Cellulose ethers such as ethyl celluloses and benzyl celluloses can also be used. The cellulose derivative of the material of higher flow rate need not necessarily be the one of lower degree of substitution, but it should, of course, be the one of lower heat-softening point. In a series of cellulose esters or ethers of progressively increasing degree of substitution the heat-softening point usually reaches a minimum at a particular degree of substitution. Thus the thermoplastic material of lower flow rate might be based on a derivative of higher degree of substitution but lower softening point than the cellulose derivative of the material of higher flow rate. It is preferred, however, to select for the cellulose derivative of higher softening point one in which the degree of substitution is above said minimum.

As colouring agents, dyes which are soluble in the cellulose derivatives, or pigments or dyes which are insoluble may be employed. The colours should be preferably provide a contrast in hue as well as in depth. Colour which is to provide the background of a pattern should be incorporated in the material of higher flow rate.

Since it is preferable to extrude at temperatures at which the material of lower flow rate does not become fluid, the particle size of this material should preferably be less than the minimum cross-sectional dimension of the extrusion orifice and less than the minimum cross-sectional dimension at any point in the passage along which the material has to travel to said orifice. Particle sizes ranging in diameter from 0.2 to 0.8 times (e. g. 0.5 to 0.75 times) the smallest of said dimensions have been found most suitable. Since homogeneity is not required in the product, the provision of the usual filter screens and strainer plates along the path of the material to the extrusion orifice is unnecessary and is preferably avoided.

The two thermoplastic compositions are preferably powdered, and mixed shortly before extrusion, care being taken to avoid mixing in such a way as to lead to interchange of plasticizer and pigment between the two materials. Alternatively the two powders may be fed simultaneously in predetermined proportions to the extruder. The relative proportions by weight of the two thermoplastic materials may range from 3:1 or more (e. g. 5:1) of the one to 3:1 or more of the other. Extrusion is carried out so as to avoid attaining or closely approaching a homogeneous condition in the material at any stage.

In the accompanying drawing which illustrates an embodiment of this invention,

Figure 1:
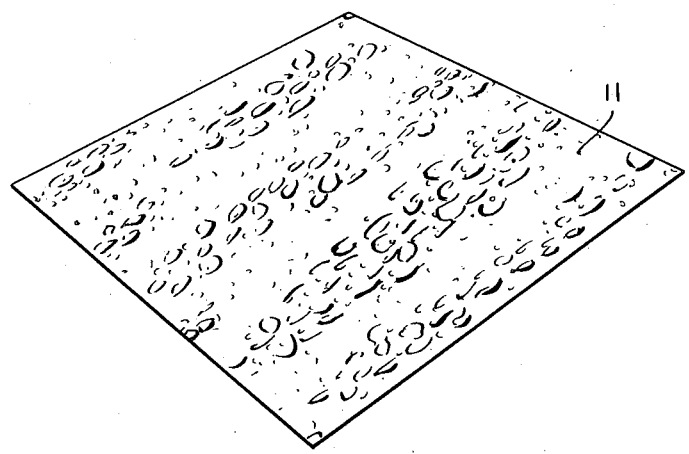
Fig. 1 shows a sheet produced in accordance with this invention.
Figure 2:
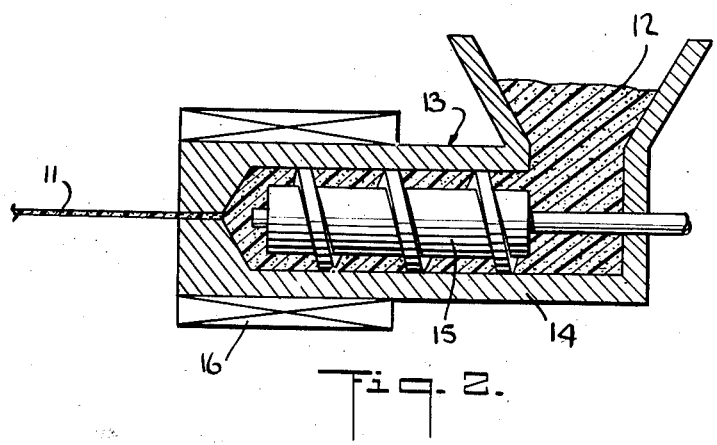
Fig. 2 shows an extruder for carrying out the process of this invention.

In the drawing, reference numeral 11 designates an extruded sheet which is produced from a mixture of thermoplastic materials in finely powdered form, indicated as 12 in Fig. 2. The powdered material is fed to a conventional hot extruder 13 and is forced through the barrel 14 of the extruder by means of a screw 15, the barrel being heated by means of a jacket 16.

The following examples, in which all the parts are by weight, illustrate the invention:

Example 1

The thermoplastic material of higher flow rate had the following composition:

76 parts of cellulose acetate of acetyl value 54%;
20 parts of diethyl phthalate;
4 parts of triphenyl phosphate.

The thermoplastic material of lower flow rate was of the same composition except that the cellulose acetate was of acetyl value 58%.

The two materials in finely powdered form were mixed in the ratio of three parts of the first to one of the second.

The mixture was fed to a screw extruder and extruded therefrom in sheet form.

The temperatures during extrusion were controlled as follows:

|  | ° C. |
|---|---|
| Die temperature | 220 |
| Gate temperature | 172 |
| Barrel (front) temperature | 197 |
| Barrel (centre) temperature | 190 |
| Barrel (rear) temperature | 139 |
| Feed box temperature | 42 |

The sheet obtained was colourless with a pleasing, irregular, raised grain effect.

Example 2

The process was carried out as in Example 1 except that the material of lower flow rate contained three parts of pigment in addition to the other constituents specified.

The sheet obtained showed a raised pattern of irregularly shaped and distributed coloured granules on a ground composed of colourless areas and areas more lightly coloured than the raised areas, irregularly distributed and irregular in shape.

Example 3

The process was carried out as in Example 1 except that the material of lower flow rate contained 8.75 parts of a dark brown pigment and the material of higher flow rate was coloured to champagne shade by the addition of 0.05 part of an organic dye soluble in the composition.

A pleasant variegated effect was obtained in the sheet, the darker colour being for the most part concentrated in raised patches but spreading to some extent into the lighter ground.

When smooth surfaced materials are required, extruded sheets having raised patterns such as those of the foregoing examples can be pressed, e. g. between heated platens, to obtain the desired effect. According to the nature of the surface required, the platens may be polished or matte and/or engraved in suitable designs. The invention includes polishing, flattening or embossing the sheets by other methods, e. g. by passing the sheet, as it comes from the die, or subsequently, round or between suitably surfaced rolls, or between suitably surfaced metal belts, or between belts and rolls. Polishing may also be effected by friction between the sheet and a stationary or moving surface. Other finishing steps that may be applied include vapour polishing and solvent-dip polishing, e. g. with acetone.

The invention includes extruding the mixed materials in other than sheet form, e. g. in rod or tube form. Blocks of the patterned material may be made, for example, by bonding sheets together or by extruding into a mould. One application of the invention is in simulating tortoiseshell.

The invention has been described with particular reference to the use of thermoplastic materials based on cellulose derivatives. The thermoplastic materials may, however, be based on other thermoplastic linear polymers, e. g. polymerised monovinyl and monovinylidene compounds such as polymers of vinyl chloride, especially copolymers with vinyl acetate and vinylidene chloride, polymers of methyl methacrylate and other thermoplastic acrylic plastic derivatives, especially copolymers of acrylonitrile with methacrylonitrile, with vinyl chloride or with vinylidene chloride, polymers of ethylene, polymers of styrene and chloro-substituted styrenes, and condensation polymers such as the nylons and other polyamides, polyesters, polyester-amides and polyamino carboxylic acids.

Having described our invention, what we desire to secure by Letters Patent is:

1. Process for making extruded products by extruding in sheet form hot thermoplastic material, which comprises feeding two plasticiser containing cellulose acetate materials of acetyl value 51 to 54% and 56 to 62.5%, respectively, and which are free from volatile liquids, to the annular space between a stationary cylindrical surface and a rotating helical surface concentric therewith, and causing said materials to be heated in said space and to be intermixed therein and extruded therefrom in sheet form as a result of the rotation of said helical surface, the temperature to which the materials are heated in said chamber being such that a coherent sheet results and that, by virtue of the different plasticities of the two materials at that temperature, in said sheet regions occupied by one of said materials are visually distinguishable from regions occupied by the other and said sheet has an irregular raised grain pattern.

2. Process for making extruded products by extruding in sheet form hot thermoplastic material, which comprises feeding two differently coloured plasticiser containing cellulose acetate materials of acetyl value 51 to 54% and 56 to 62.5%, respectively, and which are free from volatile liquids to the annular space between a stationary cylindrical surface and a rotating helical surface concentric therewith, and causing said materials to be heated in said space and to be intermixed therein and extruded therefrom in sheet form as a result of the rotation of said helical surface, the temperature to which the materials are heated in said chamber being such that a coherent sheet results and that, by virtue of the different plasticities of the two materials at that temperature, in said sheet regions occupied by one of said materials are visually distinguishable from regions occupied by the other and said sheet has an irregular raised grain pattern.

3. Process for making extruded products by extruding in sheet form hot thermoplastic material, which comprises feeding two plasticiser containing cellulose acetate materials of acetyl value 51 to 54% and 56 to 62.5%, respectively, and which are free from volatile liquids and both containing the same amounts of the same plasticiser, to the annular space between a stationary cylindrical surface and a rotating helical surface concentric therewith, and causing said materials to be heated in said space and to be intermixed therein and extruded therefrom in sheet form as a result of the rotation of said helical surface, the temperature to which the materials are heated in said chamber being such that a coherent sheet results and that, by virtue of the different plasticities of the two materials at that temperature, in said sheet regions occupied by one of said materials are visually distinguishable from regions occupied by the other and said sheet has an irregular raised grain pattern.

4. Process for making extruded products by extruding in sheet form hot thermoplastic material, which comprises feeding two differently coloured plasticiser containing cellulose acetate materials of acetyl value 51 to 54% and 56 to 62.5%, respectively, and which are free from volatile liquids and both containing the same amounts of the same plasticiser, to the annular space between a stationary cylindrical surface and a rotating helical surface concentric therewith, and causing said materials to be heated in said space and to be intermixed therein and extruded therefrom in sheet form as a result of the rotation of said helical surface, the temperature to which the materials are heated in said chamber being such that a coherent sheet results and that, by virtue of the different plasticities of the two materials at that temperature, in said sheet regions occupied by one of said materials are visually distinguishable from regions occupied by the other and said sheet has an irregular raised grain pattern.

References Cited in the file of this patent

UNITED STATES PATENTS

| | | |
|---|---|---|
| 1,735,674 | Copeland | Nov. 12, 1929 |
| 1,898,515 | Albright | Feb. 21, 1933 |